United States Patent [19]
Hamilton et al.

[11] Patent Number: 6,013,686
[45] Date of Patent: Jan. 11, 2000

[54] BLOWING AGENT CONCENTRATE

[75] Inventors: Douglas G. Hamilton, Mt.Vernon; Steven R. Peak, Evansville; Randall A. Reed, Mt. Vernon, all of Ind.

[73] Assignee: General Electric Company, Schenectady, N.Y.

[21] Appl. No.: 09/023,577

[22] Filed: Feb. 13, 1998

[51] Int. Cl.[7] ...................................................... C08S 9/00
[52] U.S. Cl. ............................................................. 521/50
[58] Field of Search ................................................ 521/50

[56]   References Cited

U.S. PATENT DOCUMENTS

| | | | |
|---|---|---|---|
| 2,999,835 | 9/1961 | Goldberg | 528/40 |
| 3,028,365 | 4/1962 | Schnell et al. | 528/196 |
| 3,153,008 | 10/1964 | Fox | 528/196 |
| 3,169,121 | 2/1965 | Goldberg | 528/176 |
| 4,156,069 | 5/1979 | Prevorsek et al. | 528/182 |
| 4,343,912 | 8/1982 | Lim | 521/90 |
| 4,430,484 | 2/1984 | Quinn | 525/425 |
| 4,454,275 | 6/1984 | Rosenquist | 524/164 |
| 4,465,820 | 8/1984 | Miller et al. | 528/194 |
| 4,487,897 | 12/1984 | Matsuoka et al. | 526/64 |
| 4,506,065 | 3/1985 | Miller et al. | 528/194 |
| 4,544,677 | 10/1985 | Allen et al. | 521/91 |
| 4,587,272 | 5/1986 | Avakian et al. | 521/86 |
| 4,616,042 | 10/1986 | Avakian | 521/81 |
| 4,683,247 | 7/1987 | Allen et al. | 521/91 |
| 4,728,673 | 3/1988 | Hammer et al. | 521/85 |
| 4,737,523 | 4/1988 | White et al. | 521/91 |
| 5,357,028 | 10/1994 | Pakull et al. | 528/196 |
| 5,360,861 | 11/1994 | Campbell | 524/494 |

*Primary Examiner*—Terressa Mosley-Boykin

[57]   ABSTRACT

The present invention relates generally to blowing agent concentrates for forming porous, molded thermoplastic items, and, more particularly to blowing agent concentrates that are compatible with polycarbonate homopolymers, but which can be extruded without causing thermal decomposition of the blowing agent.

28 Claims, No Drawings

BLOWING AGENT CONCENTRATE

BACKGROUND

The present invention relates generally to blowing agent concentrates for forming porous, molded thermoplastic items, and, more particularly to blowing agent concentrates that are compatible with polycarbonate homopolymers, but which can be extruded without causing thermal decomposition of the blowing agent.

Porous, thermoplastic molded articles are useful for various applicatioins including computer housings and outdoor telecommunication devices. Methods for making such articles typically employ a blowing agent, which is conventionally extruded together with a polymer to make polymer pellets comprising the blowing agent. These pellets are then subjected to heat and pressure in a molding process used to form useful articles. Alternatively, the pellets comprising the blowing agent (i.e., the blowing agent concentrate) may be combined with pellets of a second polymer before introducing the mixture into a molding machine. The heat and pressure employed in the molding process must be sufficient to cause the blowing agent to decompose into gaseous chemicals which do not harm the resin. These gaseous chemicals are trapped within voids present in the molded article upon cooling.

It has heretofore been difficult to employ polycarbonate homopolymer as the principle ingredient in said porous, thermoplastic molded articles because polycarbonate must be extruded at a high temperature due to its relatively high softening point. Specifically, the extrusion temperature necessary for polycarbonate is often sufficiently high to cause thermal degradation of the blowing agent prior to molding.

For the foregoing reasons, there is a need for a combination of a thermoplastic polymer and a blowing agent which can be extruded together to form a blowing agent concentrate that is compatible with polycarbonate homnopolyimer, without causing degradation of the blowincg agent.

SUMMARY OF THE INVENTION

There is provided, in accordance with the invention, an improved blowing agent concentrate that does not posses the shortcomings of the prior art, and offers the advantages of being miscible with polycarbonate homopolymer, and retaining the blowing agent without a significant degree of degradation.

More particularly, the blowing agent concentrate according to the invention comprises a polycarbonate-polyester copolymer comprising monomer units derived from a dihydric phenol and a dicarboxylic acid. Such polycarbonate-polyester copolymers and methods for making them are described in U.S. Pat. Nos. 4,506,065, 4,465,820, 4,156,069, 5,360,861, 5,357,028, 4,454,275 and 4,430,484, which are hereby incorporated by reference herein. Also, the blowing agent concentrate further comprises a blowing agent. Several blowing agents are described in U.S. Pat. No. 4,587,272, which is hereby incorporated by reference. Preferred blowing agents have a gas generation temperature (i.e., at which the agent decomposes and forms a gas) over 420° F. The blowing agent concentrate is preferably formed by extruding the polycarbonate-polyester copolymer together with the blowing agent. This extrusion must be performed at a temperature lower than the blowing agent's gas generation temperature. Extrusion methods are known, and typically employ commercially available single or double screw extrusion machines which produce homogeneous pellets of the extruded thermoplastic.

The blowing agent concentrate according to the invention may be molded by a variety of methods to produce the desired porous thermoplastic article. However, injection molding is the preferred method for making such porous thermoplastic articles. The injection molding method must be performed at conditions sufficient to cause decomposition of the blowing agent. In other words, the molding temperature must be greater than the gas generation temperature, but the pressure's effect on the gas generation temperature must also be taken into account.

If desired, extruded pellets of the blowing agent concentrate may be combined with pellets of a polycarbonate material before injection molding. The blowing agent concentrate forms an alloy with the polycarbonate material upon molding, and the gas generated from the degradation of the blowing agent ensures that a porous thermoplastic article is produced.

These and other features, aspects, and advantages of the present invention will become better understood with reference to the following description, the examples, and the appended claims.

DESCRIPTION OF THE PREFERRED EMBODIMENTIS

Briefly, according to the present invention, there is provided a blowing agent concentrate which comprises a polycarbonate-polyester copolymer comprising monomer units derived from a dihydric phenol and a dicarboxylic resin. The blowing agent concentrate further comprises a blowing agent, which preferably has a gas generation temperature above 420° F. The blowing agent concentrate is formed by extruding the copolymer and the blowing agent. The extrusion must be performed at a temperature below the gas generation temperature of the blowing agent.

Porous molded thermoplastic articles are made by molding thermoplastic resins and/or mixtures thereof, which comprise the blowing agent concentrate. Specifically, the blowing agent concentrate may be mixed together with a polycarbonate homopolymer prior to molding. Also, further additives such as nucleation agents may be employed. In a preferred embodiment of the invention, injection molding is employed to make the porous molded thermoplastic articles. The moldings temperature must be above the gas generation temperature of the blowing agent.

Several blowing agents which may be useful in the present invention are described in U.S. Pat. Nos. 4,737,523, 4,737,523, 4,728,673, 4,683,247, 4,616,042, 4,587,272 and 4,544,677, which are hereby incorporated by reference. Blowing agents are additives incorporated into the polymer which decompose to release a harmless gas upon heating them to a sufficient temperature during molding. Preferred blowing agents according to the present invention have gas generation temperatures of above 420° F. is measured at standard temperature and pressure. Some exemplary blowing agents useful in the practice of the present invention include nitroso compounds, simicarbazide compounds, tetrazole compounds, oxalate compoundis, triazine compounds, dihvdrooxadiazinione compounds and combinations thereof. Particularly preferred compounds include 5-pheny-3,6-dihydro-1,3,4-oxadiazin-2-one (hereinafter "PDOX") and 5-phenyl tetrazole, with 5-phenyl tetrazole being the most preferred.

As stated above, the polycarbonate-polyester copolymer according to the invention comprises monomer units derived from a dihydric phenol and a dicarboxylic resin. The preferred process for making: these copolymers is the interfacial polymerization technique, which is described, for example, in U.S. Pat. Nos. 3,169,121 and 4,487,897, which are hereby incorporated by reference. These polymers can also be made via melt and solid state methods. In general, the interfacial polymerization technique is performed by reacting a dihydric phenol with a carbonyl halide (the carbonate precursor) in the presence of a dicarboxylic acid (the ester precursor). The dihydric phenol and the dicarboxylic acid are each incorporated as monomer units in the resulting polymer. The production of polycarbonate-polyester copolymers according to this technique is described in detail in U.S. Pat. No. 5,360,861, which is hereby incorporated by reference. In summary, this reaction is typically performed under controlled pH conditions using an organic solvent such as methylene chloride, 1,2 dichloroethane, chlorobenzene, toluene, or the like and an immiscible aqueous phase. A catalyst, such as a tertiary amine, quaternary amine, quaternary phosphonium compound or the like, is typically employed. Preferred polycarbonate-polyester copolymers according to the invention have a molecular weight between 15,000 and 40,000, with the most preferred copolymers having a molecular weilght between about 21,800 and 23,250 (molecular weights throughout are determined by GPC using a polycarbonate standard).

In preferred polycarbonate-polyester copolymers according to the invention, the dihydric phenols employed are bis-phenols. Typical bisphenols include 2,2-bis(4-hydroxyphenyl)propane (also known as bisphenot-A), 2,2-bis(4-hydroxy-3,5-dibromophenyl)propane; dihydric phenol ethers such as bis(4-hydroxyphenyl) ether, bis(3,5-dichloro-4-hydroxyphenyl) ether; dihydroxydiphenyls such as p,p'-dihydroxydiphenyl, 3,3'-dichloro-4,4'-dihydroxydiphenyl; dihydroxyaryl sulfones such as bis(4-hydroxyphenyl) sulfone, bis (3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxyphenyl) sulfoxide and bis(3,5-dibromo-4-hydroxyphenyl) sulfoxide. A variety of additional dlihydric phenols are available and are disclosed in U.S. Pat. Nos. 2,999,835, 3,028,365 and 3,153,008; all of which are incorporated herein by reference. It is, of course, possible to employ two or more different dihydric phenols or a combination of a dihydric phenol with a glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)-propane, 2,2-bis(4-hydroxy-3,5-dichlorophenyl)-propane, hydroquinone, and the like, or bishaloformates of glycols such as bishaloformates of ethylene glycol, and the like. While all of the above carbonate precursors are useful, carbonyl chloride, also known as phosgene, is preferred.

In general, any aliphatic dicarboxylic acid conventionally used in the preparation of linear polyesters may be utilized as the ester precursor in the preparation of the polvester-carbonate resins used in the instant invention. Representative preferred dicarboxylic acids include do(decane dicarboxylic acid, adipic acid, sebacic acid, azelaic acid, suberic acid, undecanedioic acid, pimelic acid, glutaric acid, succinic acid, brassylic acid, tetradecanedioic acid, pentadecanedioic acid, hexadecanedioic acid, heptadecandioic acid, octadecandioic acid, nonadecandioic acid, eiconsanedioic acid and the like. Preferred dicarboxylic acids include those having from 4 to 36 carbon atoms, inclusive. Among these, dodecanedioic acid is most preferred.

The above-described polycarbonate-polyester copolymer is preferably blended with the above-described blowing agent by extruding the two components to form homogeneous pellets as shown in Example 1. The barrel temperature used for the extruder was preferably between 300° F. and 400° F. In a most preferred embodiment of a process for making the blowing agent concentrate according to the invention, the barrel temperature used in the extruder was from 350° F. and 400° F. The barrel temperature may be adjusted to accommodate different blowing agents having different gas generation temperatures. In a preferred embodiment of the invention, from 1% to 20% by total weight of blowing agent is added into the blowing agent concentrate. In a more preferred embodiment of the invention, from 2% to 10% by total weight of blowing agent is added into the blowing agent concentrate. The extrusion may be performed by a variety of different extruders, which are known and commercially available. Surprisingly, it was found that single screw extruders perform much better in this application than double screw extruders, as shown by Example 2. Alternate blending methods include batch mixing, continuous mixing and mill mixing.

The above-described blowing agent concentrate may be molded alone to form a porous thermoplastic article. In a preferred embodiment of the invention, the blowing agent concentrate is admixed with a polycarbonate material such as a bisphenol-A based polycarbonate homopolymer prior to molding. In a more preferred embodiment of the invention, the percentage of blowing agent added to the polycarbonate material molded is 1% to 3%. This percentage may be adjusted as desired to achieve different degrees of porosity. As stated above, the molding must be performed under conditions sufficient to cause degradation of the blowing agent. Injection molding is a preferred method for molding. In injection molding the pellets of the blowing agent concentrate and the homopolymer are mixed together in precise proportions by a mechanism which feeds certain percentages of each into the molding machine. The porous thermoplastic articles produced by the methods of the present invention are superior because they have reduced weight and increased flow of what compared with conventional molded thermoplastic articles.

Certain optional additives may be introduced into the blowing agent concentrate as processing acids, heat stabilizers and nucleants. Examples of preferred additives include the processing aid, 3,4-epoxycyclohexyl methyl 3,4-epoxcclohexvt carboxylate (i.e., ERL4221) and the heat stabilizer, Tris(2,4-Di-t-butyl phenyl) phospite. The polycarbonate materials combined with the blowing agent concentrate according to the invention typically also contain various conventional, known additives.

The following examples further illustrate some of the preferred embodiments of the invention.

EXAMPLES

Example 1

Example 1 provides a comparative test of six different attempts to make a suitable blowing agent concentrate. Examples 1–3 are performed with a higher molecular weight resin. Table I, below, summarizes these experiments:

TABLE I

|  | Sample 1 | Sample 2 | Sample 3 | Sample 4 | Sample 5 | Sample 6 |
| --- | --- | --- | --- | --- | --- | --- |
| SP100 grade resin | 100 phr | 100 phr | 100 phr | — | — | — |
| SPHF grade resin | — | — | — | 100 phr | 100 phr | 100 phr |
| 5-PT | 8 phr | 8 phr | 8 phr | 8 phr | 8 phr | 8 phr |
| ERL4221 | 0.05 phr | 0.05 | 0.05 | 0.05 | 0.05 | — |
| Irgafos 168 | 0.03 phr | 0.03 phr | 0.03 phr | 0.03 phr | 0.03 phr | 0.03 |
| Screw speed | high | high | low | low | high | low |
| Extruder | Single screw | Single screw | Single screw | Single screw | Single screw | Single screw |
| Barrel temperature | 425 F. | 400 F. | 350 F. | 400 F. | 350 F. | 350 F. |
| pellet appearance | very foamy | very foamy | slightly foamy | foamy | clear | clear |
| % 5-PT in pellet | could not pelletize | 6.7 | 6.3 | 7.2 | 7.0 | 7.6 |

In Table I:
ERL4221 is 3,4-epoxycyclohexyl methyl 3,4-epoxycyclohexyl carboxylate; SP HF is a polycarbonate-polyester copolymer comprising 8.5% DDDA (dodecane dicarboxylic aid) as a comonomer, which has a molecular weight of 21800–23250;
SP 100 grade is a polycarbonate-polyester copolymer having 8.5% DDDA (dodecane dicarboxylic acid) as a comonomer, which has a molecular weight of 31,500–33,500;
5-PT is 5-phenyl tetrazole;
phr is parts hundred resin;
Irgafos 168 is Tris (2,4-Di-t-butyl phenyl)phosphite;
a "slow" extrusion speed was 80 rpm, and a "fast" extrusion speed was 120 rpm.

A single screw extruder was used for samples 1–6. The screw diameter was 1¾ inches.

In Table I, the tests which resulted in foamy blowing agent concentrates are unacceptable because a foamy appearance indicates degradation of the blowing agent.

Table I demonstrates the production of pellets from SP100 and SPHF ("high flow") resins, and demonstrates that the SP high flow formulation, which has a lower molecular weight, is preferred. Table I also demonstrates that 350° F. is the most preferred barrel set temperature.

An exemplary, preferred blowing agent concentrate according to the present invention comprises 100 phr SPHF, 8 phr 5-PT and 0.03 phr Ingrafos 168.

Example 2

Example 2 provides a comparative test of attempts to make a suitable blowing agent concentrate using single and a twin screw extruder. As shown in Table II, below, which compares the performance of a 1¾ in. single screw extruder and a 30 mm twin screw extruder, the twin screw extruder was unsatisfactory.

TABLE II

|  | Sample 6 | Sample 7 |
| --- | --- | --- |
| SPHF grade resin | 100 phr | 100 phr |
| 5-PT | 8 phr | 8 phr |
| Irgafos 168 | 0.03 phr | 0.03 phr |
| Fxtruder | single screw | twin screw |
| Barrel temperature | 350 F. | 350 F. |
| Screw speed | low | high |
| pellet appearance | clear | foamy |
| % 5-PT in pellet | 7.6 | 4.5 |

Example 3

Example 3 provides an example of a process according to the invention for forming a molded porous thermoplastic article. Table III describes a control sample 8 and experimental samples 9 and 10 wherein porous thermoplastic articles were produced. The reduction in weight of samples 9 and 10 is a result of the porosity of the molded articles. Sample 9 was formed using a polycarbonate comprising 5 phr of PDOX, which is a standard, less preferred blowing agent. Sample 10 was formed using 5-phenyl tetrazole, the most preferred blowing agent described herein. Table III demonstrates that the blowing agent concentrate comprising 5-phenyl tetrazole achieved the highest weight reduction.

TABLE III

|  | Sample 8 | Sample 9 | Sample 10 |
| --- | --- | --- | --- |
| Blowing agent concentrate | none | FLC95 | Material from Sample 5 |
| % blowing agent concentrate | none | 7% | 1% |
| Base resin | A | A | A |
| Weight of part | 240.8 g | 211.3 g | 208.3 g |

In Table III, the formula of base resin A is:
Polycarbonate 100 phr;
LLDPE (linear low density polyethylene) 1 phr;
Methylmethacrylate-butylacrylate polymer 5 phr;
Pentaerythritol tetrastearate PETS 0.1 phr;
Carbon black concentrate (75% PC:25% carbon black) 2.47 phr; and
Tris (2,4-Di-t-butyl phenyl)phosphite (i.e., Irgafos 168) 0.03 phr.

The injection molding trials were performed by molding a 6"×8" plaque on a Van Dorn 250 ton press. The materials were dried for 4 hours at 235° F. Mold temperature was set to 180° F. Set temperatures on the molding machine were as follows:

| | |
|---|---|
| Zone 1 | 515° F. |
| Zone 2 | 525° F. |
| Adapter | 545° F. |
| Nozzle | 540° F. |

First inject time=1.47 s
2nd injection hold=20 s
Mold closed=30 s
Total cycle=60.2 s
1st injection pressure (boost)=400 psi
2nd Injection pressure (hold)=100 psi
Back pressure=55 psi
Clamp pressure=250 ton
Extruder rate=65 rpm
Shot size=4"
cushion=0"
Injection travel time=3 s Although the present invention has been described in considerable detail with reference to the preferred versions thereof, other versions are possible. For example, other molding processes may be employed, such as water pressure molding. Therefore, the spirit and scope of the appended claims should not be limited to the description of the preferred versions contained herein.

We claim:

1. A blowing agent concentrate for producing foamed parts upon molding, which concentrate comprises: a polycarbonate-polyester copolymer comprising monomer units derived from a dihydric phenol and a dicarboxylic acid, and a blowing agent having a gas generation temperature greater than 420° F.

2. A blowing agent concentrate according to claim 1, wherein the polycarbonate-polyester copolymer comprises from 5–15% monomer units derived from a dicarboxylic acid, and the dihydric phenol is a bisphenol.

3. A blowing agent concentrate according to claim 2, wherein the dicarboxylic acid is selected from the group consisting of dodecane dicarboxylic acid, adipic acid, sebacic acid, azelaic acid, suberic acid, pimelic acid, undecanedlioic acid, glutaric acid, succinic acid, brassylic acid, tetradecanedioic acid, pentadecanedioic acid, hexadecanedioic acid, hexadecandioic acid, heptadecandioic acid, octadecandioic acid, nonadecandioic acid, eiconsanedioic acid and all other dicarboxylic acids having from 4 to 36 carbon atoms.

4. A blowing agent concentrate according to claim 3, wherein the blowing agent is selected from the group consisting of nitroso compounds, simicarbazide compounds, tetrazole compounds, oxalate compounds, triazine compounds, dihydrooxadiazinone compounds and combinations thereof.

5. A blowing agent concentrate according to claim 4, wherein the blowing agent is 5-phenyl tetrazole.

6. A blowing agent concentrate according to claim 3, wherein the dicarboxylic acid is dodecandioic acid.

7. A blowing agent concentrate according to claim 2, which further comprises tris(2,4-Di-t-butyl phenyl) phosphite.

8. A blowing agent concentrate formed by blending together: (i) a polycarbonate-polyester copolymer comprising monomer units derived a dihydric phenol and a dicarboxylicacid, and (ii) 10 weight % or less of a blowing agent having a gas generation temperature greater than 420° F., wherein said blending is performed at a temperature between 300° F. and 400° F.

9. A process for making a blowing agent concentrate according to claim 8, wherein said blending step is performed by extrusion.

10. A blowing agent concentrate according to claim 9, wherein the extrusion is performed using a single screw extruder.

11. A process for making a blowing agent concentrate, said process comprising: blending together: (i) a polycarbonate-polyester copolymer comprising monomer units derived from a dihydric phenol and a dicarboxylic acid, and (ii) a blowing agent having a gas generation temperature greater than 420° F.; wherein said blending is performed at a temperature between 300° F. and 400° F.

12. A process according to claim 11, wherein said blending is performed by extrusion.

13. A process according to claim 12, wherein the polycarbonate-polyester copolymer comprises from 5 to 15% monomer units derived from a dicarboxylic acid, and the dihydric phenol is a bisphenol.

14. A process according to claim 13, wherein the dicarboxylic acid is selected from the group consisting of dodecane dicarboxylic acid, adipic acid, sebacic acid, azelaic acid, suberic acid, pimelic acid, undecanedioic acid, pimelic acid, glutaric acid, succinic acid, brassylic acid, tetradecanedioic acid, pentadecanedioic acid, hexadecanedioic acid, heptadecandioic acid, octadecandioic acid, nonadecandioic acid, eiconsanedioic acid and all other dicarboxylic acids having from 4 to 36 carbon atoms.

15. A process according to claim 14, wherein the blowing agent is selected from the group consisting of nitroso compounds, simicarbazide compounds, tetrazole compounds, oxalate compounds, triazine compounds, dihydrooxadiazinone compounds and combinations thereof.

16. A process according to claim 15, wherein the blowing agent is 5-phenyl tetrazole.

17. A process according to claim 14, wherein the dicarboxylic acid is duodecanoic acid.

18. A process according to claim 13, wherein polycarbonate-polyester copolymer further comprises tris(2, 4-Di-t-butyl phenyl)phosphite.

19. A process for producing a porous thermoplastic article, which process comprises: (A) blending together: (i) a polycarbonate-polyester copolymer comprising monomer units derived from a dihydric phenol and a dicarboxylic acid, and (ii) a blowing agent having a gas generation temperature greater than 420° F.; wherein said blending is performed at a temperature between 300° F. and 400° F., thereby forming a blowing agent concentrate, and (B) injection molding said blowing agent concentrate at a temperature above the gas generation temperature of the blowing agent.

20. A process according to claim 19, wherein the blowing agent concentrate is combined with a second polycarbonate material prior to said injection molding step.

21. A process according to claim 20, wherein the polycarbonate-polyester copolymer comprises 5–15 % monomer units derived from a dicarboxylic acid.

22. A process according to claim 21, wherein the dicarboxylic acid is selected from the group consisting of dodecane dicarboxylic acid, adipic acid, sebacic acid, azelaic acid, suberic acid, pimelic acid, undecanedioic acid, pimelic acid, glutaric acid, succinic acid, brassylic acid, tetradecanedioic acid, pentadecanedioic acid, hexadecanedioic acid, hexadecanedioic acid, heptadecanidioic acid, octadecandioic acid, nonadecandioic acid, eiconsanedioic acid and all other dicarboxylic acids having from 4 to 36 carbon atoms.

23. A process according to claim 22, wherein the blowing agent is selected from the group consisting of nitroso compounds, simicarbazide compounds, tetrazole compounds, oxalate compounds, triazine compounds, dihydrooxadiazinone compounds and combinations thereof.

24. A process according to claim 23, wherein the blowing agent is 5-phenyl tetrazole.

25. A process according to claim 22, wherein the dicarboxylic acid is duodiecanoic acid.

26. A process according to claim 20, wherein polycarbonate-polyester copolymer further comprises tris(2, 4-Di-t-butyl phenyl)phosphite.

27. A porous molded thermoplastic article formed by a process, which process comprises: (A) extruding together: (i) a polycarbonate-polyester copolymer comprising monomer units derived from a bisphenol and a dicarboxylic acid, and (ii) a blowing agent having a gas generation temperature greater than 420° F.; wherein said extrusion is performed at a temperature of 400° F. or below, thereby forming a blowing agent concentrate, and (B) injection molding said blowing agent concentrate at a temperature above the gas generation temperature of the blowing agent.

28. A porous molded thermoplastic article formed by the process according to claim 23, wherein the blowing agent concentrate is combined with a polycarbonate homopolymer prior to said injection molding step.

* * * * *